Patented Dec. 15, 1953

2,662,873

UNITED STATES PATENT OFFICE 2,662,873

MELAMINE CONDENSATION PRODUCTS AND METHOD OF PREPARING THE SAME

Franz Kaess, Trostberg, Ernst Doehlemann, Thalham, near Altenmarkt, and Erwin Vogel, Trostberg, Germany, assignors to Sueddeutsche Kalkstickstoff-Werke A. G., Trostberg, Germany No Drawing. Application April 5, 1951,
Serial No. 219,528

Claims priority, application Germany
August 24, 1950

6 Claims. (Cl. 260—67.6)

The invention relates to resinous melamine condensation products.

Such products have been prepared heretofore by condensing melamine with formaldehyde or with compounds splitting off formaldehyde, such as formaldehyde hydrate, paraformaldehyde or hexamethylenetetramine. Instead of formaldehyde, aldehydes containing more than one C atom, for instance acetaldehyde, benzaldehyde, crotonaldehyde, have been proposed for the same purpose.

The object of the invention is to provide a novel group of melamine condensation products which are characterized by cross linkages and are suitable for a wide variety of industrial applications.

Another object is to provide a suitable method for the preparation of such condensation products.

According to the invention, melamine is reacted with alcohols and ethers derived from carbamides to form resinous cross-linked products. Such alcohols and ethers are represented by the general formulae

and

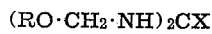

wherein R is alkyl, oxyalkyl, or hydrogen and X designates NH, O, S, NCN or NCONH$_2$.

These compounds are obtained by etherification of the methylol derivatives of guanidine, dicyanodiamide, thiourea, and the like with the respective alcohols.

The condensation is readily carried out by dissolving melamine in the alcohol or ether at temperatures of 60–120° C. Depending on the temperatures and the ratio of the reactants used, resins of varying properties are obtained after a reaction time of 15–60 min. This method of preparation opens up the way of obtaining a novel group of resins adaptable to a wide range of uses. Varying degrees of polymerization, solubility and compatibility with solvents and a wide scale of mechanical properties such as elasticity, hardness, etc. may be attained, depending on the characteristics of the starting materials and on the nature and chain length of the alcohol used for the etherification, and by a suitable adjustment of the relative amounts of the reactants.

The obtained resins are soluble in glycol and also, according to the conditions selected for the preparation, in water, methanol, butanol, etc. An after-treatment with a formaldehyde solution, in which the resins are also soluble, may increase the cross-linkages.

In order to obtain a homogeneous solution in the conversion of melamine, it is often necessary to apply an excess of alcohol or ether. This will depend on the properties of the specific components used for the reaction. The amount of melamine may form 5 to 50 per cent of the reaction mixture. Even small amounts of melamine impart its valuable properties as a strongly cross-linking component to the obtained products.

The following examples are given to illustrate the method of invention and are not to be considered as limiting the invention. All parts are given by weight.

*Example 1*

A mixture of—

50 parts of melamine
100 parts of dimethylol thiourea, and
100 parts of wood pulp are molten at 85–100° C., and subsequently kneaded with 15 parts of glycol
2.5 parts of stearic acid, and
30 parts of lithopone.

After drying, milling and pressing, clear masses are obtained which are resistant to boiling.

*Example 2*

100 parts of melamine are dissolved in 100 parts of monomethylol thiourea at a temperature of 70–80° C.

15 parts of glycol are stirred into the mass and the mixture is treated on a water bath at 70° C. at a pH of 8.2 with 250 parts by volume of 30% formaldehyde for one hour. After addition of stearic acid, zinc stearate and 200 parts of cellulose, the mix is rolled, milled, and pressed. The obtained mass is readily flowing and compressed to granules which are resistant to boiling.

*Example 3*

50 parts of melamine are molten with 100 parts of dimethylolguanidine nitrate with thorough malaxing. A hydrophobic resin is obtained.

*Example 4*

4 parts of melamine in form of a fine powder are slowly added to 23 parts of dicyanodiamide dimethyloldimethylether at a temperature of 80 to 105° C. The molten reaction product is dissolved in hot water; the solution is kneaded with 25 parts of wood flour and a fluxing agent, dried and processed to a molding powder.

*Example 5*

20 parts of dicyanodiamide dimethylol-dibutylether are molten with 1 part of melamine at 100 to 110° C. The conversion product is emulsified by means of a suitable emulsifying agent in butanol and water. The emulsion is suitable for impregnating and water proofing of textiles.

*Example 6*

5 parts of finely powdered melamine are dissolved at 100° C. in 100 parts of thiourea monomethylolisopropylether. The obtained resinous product is a suitable ingredient in lacquer raw materials.

*Example 7*

The resin obtained according to Example 4 is admixed with a diluting agent and poured out to a drying film.

If the ether recited in Example 4 is treated in the same way without the addition of melamine, a film is obtained which remains viscous.

What we claim is:

1. A method as defined in claim 5 comprising the step of treating the obtained resins with formaldehyde.

2. As a new chemical compound, the crosslinked resinous product prepared by the anhydrous condensation of a molten mixture of melamine and a methylol thiourea.

3. As a new chemical compound, the crosslinked resinous product prepared by the anhydrous condensation of a molten mixture of melamine and a dicyanodiamide dimethyloldialkylether.

4. As a new chemical compound, the crosslinked resinous product prepared by the anhydrous condensation of a molten mixture of melamine and a dimethylol guanidine salt.

5. A method of preparing crosslinked resinous melamine condensation products which comprises heating an anhydrous mixture containing melamine and an amino-carbinol compound to the melting point so as to dissolve the melamine in said amino-carbinol compound and maintaining the mixture in the molten state for a period of 15 to 60 minutes at a temperature not exceeding 120° C., said amino-carbinol compound being selected from the group consisting of compounds of the formula:

$RO \cdot CH_2 \cdot NH \cdot CX \cdot NH_2$ and $(RO \cdot CH_2 \cdot NH)_2 \cdot CX$ wherein R is a member of the group consisting of hydrogen, alkyl and oxyalkyl and X is a member of the group consisting of NH, O, S, NCN and $NCONH_2$.

6. As a new composition of matter, the crosslinked resinous product prepared by the anhydrous condensation of a molten mixture of melamine and an amino-carbinol compound selected from the group consisting of compounds of the formula $RO \cdot CH_2 \cdot NH \cdot CX \cdot NH_2$ and $(RO \cdot CH_2 \cdot NH)_2 \cdot CX$ wherein R is a member of the group consisting of hydrogen, alkyl and oxyalkyl and X is a member of the group consisting of NH, O, S, NCN and $NCONH_2$.

FRANZ KAESS.
ERNST DOEHLEMANN.
ERWIN VOGEL.

References Cited in the file of this patent

UNITED STATES PATENTS

| Number | Name | Date |
|---|---|---|
| 2,328,424 | D'Alelio | Aug. 31, 1943 |
| 2,351,602 | D'Alelio | June 20, 1944 |
| 2,368,451 | D'Alelio | Jan. 30, 1945 |
| 2,548,416 | Barsky | Apr. 10, 1951 |

FOREIGN PATENTS

| Number | Country | Date |
|---|---|---|
| 877,994 | France | Sept. 21, 1942 |